Oct. 20, 1970  G. ANDERSON  3,535,135
SAND-LIME BRICKS AND METHOD OF MAKING
Filed Oct. 13, 1967

INVENTOR
GORDON ANDERSON

BY Larson and Taylor

ATTORNEYS

3,535,135
SAND-LIME BRICKS AND METHOD OF MAKING
Gordon Anderson, Kumla, Sweden, assignor to
Intong Aktiebolag, Hallabrottet, Sweden
Filed Oct. 13, 1967, Ser. No. 675,222
Int. Cl. C04b *35/14, 35/22*
U.S. Cl. 106—63                               4 Claims

ABSTRACT OF THE DISCLOSURE

Textured sand-line bricks are prepared according to the invention by splitting bricks having sand particles which are not stronger, in tension, than the calcareous binder. Thus, on splitting the brick, sand particles disposed along the line of cleavage are also split thus providing a pleasing, smooth, textured brick face. Crushed lingulid sandstone is a suitable source of sand material.

DESCRIPTION OF THE INVENTION

Sand-lime bricks are generally produced by mixing a calcareous binder with a sand filler material which is a silicate-containing mineral, after which water is added to the mixture. A plastic mass is thus formed, which is then worked to the size desired in high pressure pressing machines. After pressing, the bodies, which are to a certain degree pre-hardened, are hardened in autoclaves with steam at elevated pressure and temperature, whereby the filler material and the binder chemically react with each other, forming a final brick product with high compressive strength and good frost resistance.

As the calcareous binder, lime is most often used, but also cement or combinations of lime and cement can be used. The filler material is generally constituted of sand as it exists in nature, e.g. in sand pits, sandy soil or the like.

Sand-lime bricks produced according to the foregoing method are formed, e.g. to parallelepipeds of different sizes, which are used as building brick stones for the erecting of houses. The surfaces of the stones are, however, completely smooth and exhibit a dull texture, which makes the stones less suitable for application in facings.

In order to overcome this disadvantage it has been suggested to split up the stones in a way that gives the split surface a rustic and living character. To further accentuate this effect it has also been suggested to use crushed sandstone instead of natural sand as filler material. For this purpose, the crushed sandstone has been graduated in grain sizes from 8 mm. down to cement fineness. Filler grains within the group 1–8 mm. are well visible in the split surface, while the finer filler grains react with the binder, so that they are absorbed by the binder.

However, when producing sand-lime bricks based on natural sand, difficulties arise, which among other things manifest themselves by the stones tending to be split skewly, which causes expensive rejections of unusable material. Furthermore, the stones obtain a rutty and a very uneven surface texture, which interferes with the sense of beauty, and whereby dirt and other deposits get stuck in the cavities of the surface. This is particularly the case when the filler material has a grain size of 1 mm. and coarser. Furthermore, the free surface of the filler grains on the split surface of the brick are covered with binder, which makes the stones obtain a less beautiful appearance.

The present invention relates to a method of producing sand-lime bricks, whereby the above mentioned disadvantages are eliminated, and whereby it is possible to produce bricks with a pleasing surface effect. The invention is characterized in that the siliceous filler particles having a particle size of from 1 mm. to 8 mm. do not exceed the strength, in tension, of the calcareous binder.

Figure 1:
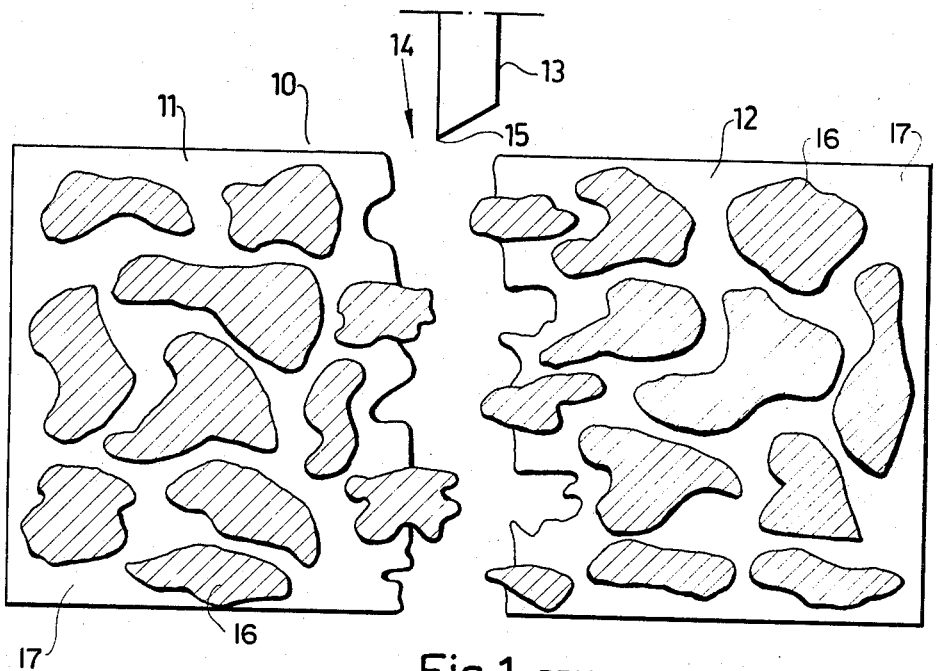

The invention will be described in detail in the specification which follows which includes a preferred embodiment and drawings in which FIG. 1 is a cross-sectional view of a split sand-lime brick, produced in the conventional way.

Figure 2:
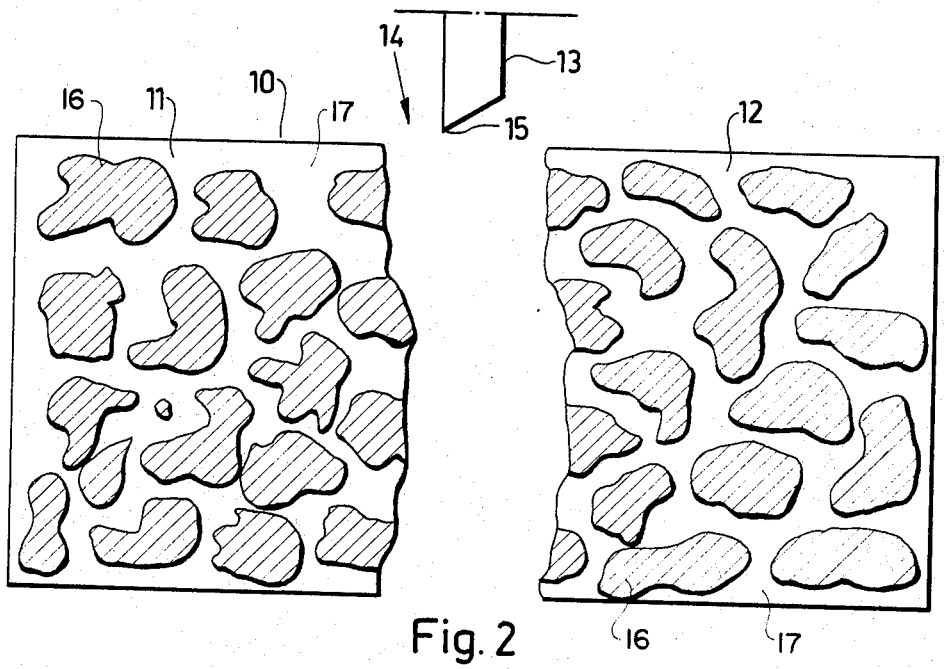

FIG. 2 is a cross-sectional view of a split sand-lime brick, produced according to the present invention.

In FIG. 1 there is shown a sand-lime brick 10 which has been divided into two halves 11, 12 by a cutting edge 13. The splitting can be effected by placing the stone 10 which rests on a conveyor belt (not shown in the figure) below the cutting edge 13. The latter, when the stone is located underneath the edge, is given a movement downwards (see arrow 14), which is adjusted in such a way that the bottom part 15 of the edge initiates fracture and the bevelled part of the edge separates the stone into two halves, owing to the tension, arising in the stone along the line of cleavage. The split surface will be given an appearance, as shown in the figure, of being rutty or showing crowns. This is caused by the fact that the filler material having a particle size of from 1 mm. to 8 mm. has such a high strength, in tension, in comparison with the strength of the binder, that the filler grains are unable to split thereby remaining cemented in the binder. Thus, only the binder splits according to the prior art.

If, on the contrary, one proceeds according to the present invention, a split of both binder and filler material is obtained. In FIG. 2 is shown a sand-lime brick, which is produced of a binder with a strength, in tension, greater than that of the filler material particles having a size of from 1 mm. to 8 mm. There is thus obtained, by splitting, a stone surface, showing split filler grains with planar fractured surfaces which lie generally in the plane of the line of cleavage of the brick.

EXAMPLE 1

According to the preferred embodiment of the invention, the sand-lime bricks are produced from water, lime and sandstone. The characteristics of the components are:

Lime

| Grains coarser than, mm.: | Percent by weight |
|---|---|
| 0.09 | 1 |
| 0.04–0.09 | 19 |
| Grains finer than 0.04 mm. | 80 |

The unslaked lime shows a free CaO content of 87%.

Sandstone

The sandstone, which is of type called "lingulid sandstone" exhibits, according to the invention a low strength and is thus easily crushed. The sandstone is crushed to the following particles size:

| Grains coarser than, mm.: | Percent by weight |
|---|---|
| 4 | |
| 3–4 | 11 |
| 2–3 | 10 |
| 1–2 | 12 |
| 0.5–1 | 4 |

| Grains coarser than, mm.: | Percent by weight |
|---|---|
| 0.25–0.5 | 19 |
| 0.12–0.25 | 20 |
| Grains finer than 0.12 mm. | 20 |

The $SiO_2$ content of the sandstone amounts to 95%.

The process is performed in the following way. Fifteen tons of crushed "lingulid sandstone" is mixed with 1.15 tons of lime in a barrel, whereafter is added 5% by weight of water, dry weight basis, for obtaining a workable plastic mass. The plastic mass is shaped to stones in a pressing machine, working at a pressure of 370 kp./cm.$^2$. The shaped stones are put into an auotclave, in which they are steam-cured for 10 hours at a pressure of 16 kp./cm.$^2$ and at a temperature of 200° C. The hardened stones are split, whereby both the binder and the sandstone-grains are split on account of the markedly low strength of the lingulid sandstone. The surfaces resulting from splitting the brick as shown in FIG. 2 include a substantially continuous phase of calcareous binder, a substantially discontinuous phase of siliceous particles having a particle size of less than 8 mm. Substantially all of the sand particles of the discontinuous phase have an essentially planar face lying in the cleavage plane of the brick.

EXAMPLE 2

As a comparison, a test was performed to produce a lime-sandstone, starting from lime and quartz-sand, wherein the same kind of lime was used as in Example 1, and wherein the quartz-sand has the following particle size:

| Grains coarser than, mm.: | Percent by weight |
|---|---|
| 4 | 6 |
| 3–4 | 10 |
| 2–3 | 12 |
| 1–2 | 10 |
| 0.5–1 | 6 |
| 0.25–0.5 | 20 |
| 0.12–0.25 | 20 |
| Grains finer than 0.12 mm. | 16 |

Fifteen kilograms of crushed quartz-sand was mixed together with 1.15 kilograms of lime, whereafter approximately 5% by weight of water was added. The raw mass thus obtained was formed and hardened under the same conditions as the sand-lime bricks in Example 1. Upon splitting the hardened stones, no characteristic lustre was obtained on the cut surface. The cut occurred in the binder only, while substantially all of the filler grains having a particle size of from 1 to 8 mm. remained intact, encased in the binder, as shown in FIG. 1.

In the preferred embodiment of Example 1, the ingredients of the brick formulation are set out in detail. It will be apparent, however, that the nature of the ingredients, as well as the brick-making technique, can vary widely. The essential requirement of the invention is that the strength, in tension, of the sand particles having a particle size of one mm. or more, is not greater than the strength of the calcareous binder. This can be achieved by utilizing weak sandstone as shown in the examples, or by using strong binder in combination with weak sandstone. Larger sandstone particles will be inherently stronger in tension than smaller particles and, for this reason, it is preferred that the sandstone particles should not exceed 8 mm. in size. While some larger material is tolerable, and may be added for special effects, it is preferred that at least 90% by weight of the sandstone is less than 8 mm. in size and still more preferably, less than 4 mm. in size. As mentioned, the relative strength of the binder and filler material may be effected by using strong filler material in conjunction with weak sandstone. Strong filler material may be provided by conventional formulation and/or process techniques such as by using cement-lime combinations, by increasing pressure or steam-hardening temperatures during brick fabrication or by combinations of one or more of these techniques. The preferred technique, however, is to use weak sandstone, such as the lingulid type, which is readily available. The sandstone is easily crushed and contains both fine and coarse material. The sandstone generally comprises at least 20% fines below 1 mm. and at least 20% coarse particles above 1 mm. and, additionally, at least 90% of the particles are less than 8 mm., more preferably less than 4 mm. Suitable preferred ranges are indicated in the table which follows:

| Particle size, mm. | Intermediate preferred range, percent by wt. | Narrow preferred range, percent by wt. |
|---|---|---|
| >4 | 2–10 | 3–5 |
| 3 to 4 | 5–20 | 9–13 |
| 2 to 3 | 5–20 | 8–12 |
| 1 to 2 | 5–20 | 10–14 |
| 0.5 to 1 | 2–10 | 3–5 |
| 0.25 to 0.5 | 5–30 | 16–22 |
| 0.12 to 0.25 | 5–30 | 17–23 |
| <0.12 | 5–30 | 17–23 |

The amount of sandstone and lime, as CaO, in the finished brick can vary within known limits. Generally, the sandstone constitutes about 93% of the brick and the lime about 7%, weight basis. The amount of lime can vary within known limits of, e.g., from 3 to 11% of the dry ingredients. The lime and the sandstone do not require to be pure and are preferably impure to reduce costs. The silica content of the sandstone is preferably at least 85% and the CaO content of the lime is preferably at least 70% but less pure materials can be used as known in the art. The water used to make the brick is generally employed in an amount of 5% by weight of the dry ingredients, and the amount of water can vary within known limits of, e.g., from 3 to 7% by weight of the dry ingredients. The essential point, according to the present invention, is that the sandstone particles, having a size of between 1 and 8 mm., are not stronger, in tension, than the calcareous binder. The adhesive strength between the binder and filler of conventional sand-lime brick as well as brick according to the present invention, exceeds the binder cohesive strength. Accordingly, the prevailing tendency upon splitting a brick according to the present invention is to form a generally planar surface along the line of cleavage which surface shows a continuous binder phase and a discontinuous filler phase composed of particles having a size of from 1 to 8 mm., substantially all of which are split along the general line of cleavage of the brick.

What is claimed is:

1. A sand-lime brick having a textured face, said brick comprising: a continuous silicate-lime binder phase and a discontinuous silicate particle phase; the lime content of said brick being from 3 to 11% by weight; the silicate particles having a particle size of from 1 to 8 mm. and being present in an amount of from 20 to 80% by weight of the silicate content of the brick; said silicate particles being not stronger, in tension, than said continuous silicate-lime phase; said brick having a textured face resulting from splitting away a portion of brick material therefrom, said textured face comprising said continuous silicate-lime phase and split particles of said discontinuous silicate particle phase, each split particle having a split surface lying in said textured face.

2. A sand-lime brick according to claim 1 wherein said silicate particles comprise crushed lingulid sandstone.

3. A sand-lime brick according to claim 1 wherein said sandstone has the following particle size distribution:

| Size, mm.: | Range, percent by weight |
|---|---|
| >4 | 2–10 |
| 3–4 | 5–20 |
| 2–3 | 5–20 |
| 1–2 | 5–20 |
| 0.5–1 | 2–10 |
| 0.25–0.5 | 5–30 |
| 0.12–0.25 | 5–30 |
| <0.12 | 5–30 |

4. A sand-lime brick according to claim 1 wherein said sandstone has the following particle size distribution:

| Size, mm.: | Range, percent by weight |
|---|---|
| >4 | 3–5 |
| 3–4 | 9–13 |
| 2–3 | 8–12 |
| 1–2 | 10–14 |
| 0.5–1 | 7–5 |
| 0.25–0.5 | 16–22 |
| 0.12–0.25 | 17–23 |
| <0.12 | 17–23 |

References Cited

UNITED STATES PATENTS

| 280,332 | 6/1883 | Stone | 106—120 |
| 2,584,604 | 2/1952 | Mendius | 106—120 |

FOREIGN PATENTS 745,912   3/1956   Great Britain.

JAMES E. POER, Primary Examiner

U.S. Cl. X.R.

106—120